C. O. BERGSTROM.
ELECTRIC AIR HEATER.
APPLICATION FILED JULY 2, 1915.
1,235,761.
Patented Aug. 7, 1917.
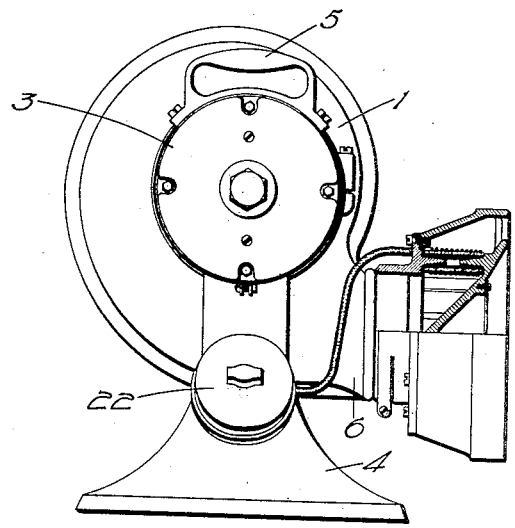
FIG. 1.
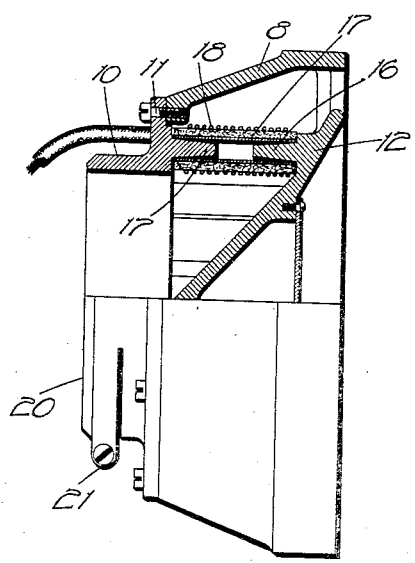
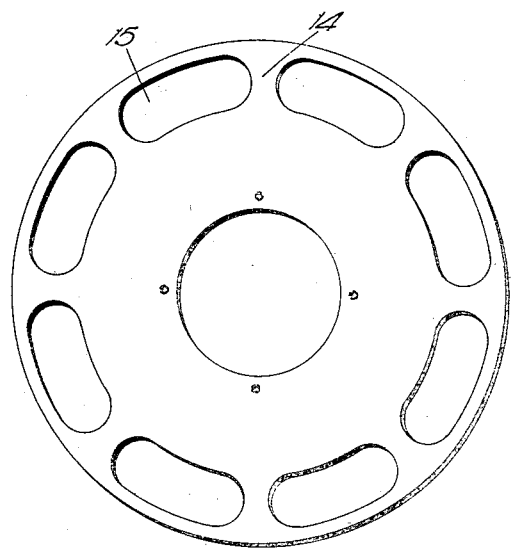
INVENTOR:
Carl O. Bergstrom
by his Attorneys
Phillips Van Everen & Fish

UNITED STATES PATENT OFFICE.

CARL O. BERGSTROM, OF BOSTON, MASSACHUSETTS, ASSIGNOR TO B. F. STURTEVANT COMPANY, OF BOSTON, MASSACHUSETTS, A CORPORATION OF MASSACHUSETTS.

ELECTRIC AIR-HEATER.

1,235,761.     Specification of Letters Patent.     Patented Aug. 7, 1917.

Application filed July 2, 1915. Serial No. 37,695.

*To all whom it may concern:*

Be it known that I, CARL O. BERGSTROM, a citizen of the United States, residing at Boston, in the county of Suffolk and State of Massachusetts, have invented certain new and useful Improvements in Electric Air-Heaters; and I do hereby declare the following to be a full, clear, and exact description of the invention, such as will enable others skilled in the art to which it appertains to make and use the same.

The present invention relates to air heating apparatus and more particularly to portable electric heaters.

This type of heater embodies a fan or other type of blower connected with an electric heating unit in such a manner that a relatively large volume of air is forced through the heating unit. The entire apparatus is compact and may be readily transported from place to place. As this type of apparatus combines the function of a ventilator and air heater it may be used to advantage in a variety of ways. The heater is more particularly useful in connection with the heating of rooms where it is impracticable to employ the regular heating systems.

The object of the present invention is to provide an improved heating apparatus of this type which is simple and compact in form, and is efficient in its operation, delivering a large volume of heated air in proportion to the size of the heating units.

With this object in view the several features of the invention consists in certain novel features of construction, combinations and arrangements of parts hereinafter described and claimed the advantages of which will be obvious to those skilled in the art from the following description.

In the accompanying drawings illustrating the preferred form of the invention; Figure 1 represents a side elevation partly in section of the heating apparatus; Fig. 2 is a detail showing upon an enlarged scale an elevation partly in section of the heater casing removed from the fan outlet; and Fig. 3 is a detail showing a front elevation of the heater casing and illustrating the annular series of delivery openings.

According to the present invention a large volume of air is forced by a blower over a series of heating units disposed in the path of the air in such a manner that all of the air delivered is heated to a uniform temperature. The blower is directly connected to an electric motor of suitable form and both the motor and heating units are preferably connected to a common source of electrical energy through a single switch. This construction provides a compact, self-contained apparatus which is simple and efficient and may be readily transported from place to place.

In the illustrated embodiment of the invention the blower, indicated generally at 1, consists of the usual type of high speed multi-vane fan which is direct connected to an electric motor indicated at 3. The apparatus is supported upon a base 4 and a handle 5 attached to the motor casing enables it to be removed wherever desired. The blower casing is provided with the usual type of outlet 6 which directs air into the heater member. The heater member is adapted to be secured to the outlet 6 of the blower and is provided with an air diffusing passage having heating units supported therein over which the air passes. The heater member, as shown in the illustrated embodiment of the invention, comprises a heater casing 8 and a cover casing 10 secured thereto by threaded fastenings 11, as shown clearly in Fig. 2 of the drawings. The heater casing is provided with a substantially conical web or partition 12 connected integrally with the casing by a series of radial arms 14 to provide a series of air outlets 15 arranged to form an annular delivery opening. The web 12 is provided with a series of rearwardly extending fingers 16 which coöperate with similar fingers 17 formed upon the cover casing 10 to support the heating units at uniform intervals when the two casings are secured together. Each heating unit, as shown clearly in Fig. 2 of the drawings, consists of a heat resisting and non-conducting tube 17 supported at opposite ends upon the fingers and surrounded by a heating coil 18 which is connected with the source of electrical energy in any suitable manner. The cover casing 10 is provided with a split hub 20 which is adapted to fit over the outlet of the fan and is secured in place by a clamping bolt 21. In order to permit the free passage of the air through the heater member the area of the air passage around the heating units, and of the outlet ports 15 is substantially equal to the area of the fan outlet 6. The heating apparatus is conveniently controlled by a switch, indicated at 22, which is arranged to perform several functions, permitting the blower to be operated either with or without the heater, but not permitting the heater to be operated except in conjunction with the blower. Owing to the arrangement of the air passages in the heater and the fact that there is no substantial impedance to a flow of air therethrough the apparatus may be operated simply as a ventilator without substantially impairing the efficiency of the blower. Furthermore, it will be obvious that owing to the method of attaching the heater member to the outlet of the blower this portion of the apparatus may be readily attached to existing types of fans which are not already provided with heater members, or the heater member may be readily removed and the blower employed for other purposes when desired.

While it is preferred to employ the specific construction and arrangement of parts shown and described, it will be understood that this construction and arrangement is not essential except so far as specified in the claims, and may be changed or modified without departing from the broader features of the invention.

The invention having been described, what is claimed is:—

1. An air heater, having in combination, a casing having an air passage formed therein, a plurality of heating units supported in the air passage within the casing, and a hub projecting from the casing and constructed and arranged to be attached to the usual delivery outlet of a fan.

2. An air heater, having in combination, a heater casing, a hub extending from the casing and adapted for attachment to the usual delivery outlet of a fan, a conical web formed within the casing and providing an air delivery passage in conjunction with the casing, and a plurality of heating units supported within the air passage and positioned at uniform intervals from one another.

3. An air heater comprising a casing adapted to be clamped to the outlet of a fan, a conical web formed in the casing and arranged to provide a diffusing air passage having a plurality of delivery openings, and a series of heating coils supported in the air passage.

4. An air heater comprising a casing member, a conical web formed upon the interior of the casing member, a plurality of fingers projecting from the conical web, a coöperating casing member, a plurality of fingers formed upon this latter member, means for securing the two casing members together, and a heating coil supported upon each pair of coöperating fingers.

5. An air heater comprising a casing member adapted to be clamped to the outlet of a fan and having a series of laterally extending fingers, a delivery casing secured thereto, a conical web formed upon the delivery casing to provide an air passage and having a series of coöperating fingers extending therefrom, and a plurality of heating coils supported by the coöperating fingers in the air passage.

6. An air heater comprising a fan, a delivery casing having an air outlet and an air passage communicating therewith, and a series of heating units supported in the air passage and each consisting of a heat-resisting and non-conducting tube supported at opposite ends by the casing and surrounded by a heating coil.

CARL O. BERGSTROM.